(12) United States Patent
Yamamoto et al.

(10) Patent No.: US 7,573,798 B2
(45) Date of Patent: Aug. 11, 2009

(54) MULTI-LEVEL INFORMATION REPRODUCING METHOD

(75) Inventors: Masakuni Yamamoto, Yamato (JP); Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 11/435,895

(22) Filed: May 18, 2006

(65) Prior Publication Data

US 2006/0280069 A1    Dec. 14, 2006

(30) Foreign Application Priority Data

May 24, 2005   (JP)   ............... 2005-150985

(51) Int. Cl.
*G11B 5/09*   (2006.01)
(52) U.S. Cl. .............. 369/59.23; 369/275.4; 369/59.15; 369/53.33
(58) Field of Classification Search .............. 369/59.11, 369/47.1
See application file for complete search history.

(56) References Cited

U.S. PATENT DOCUMENTS

| | | | |
|---|---|---|---|
| 5,365,535 A | 11/1994 | Yamaguchi et al. | |
| 6,999,398 B2 | 2/2006 | Yamamoto et al. | |
| 2005/0195730 A1* | 9/2005 | Maegawa | 369/275.4 |
| 2005/0213462 A1* | 9/2005 | Maegawa | 369/59.11 |
| 2007/0025217 A1 | 2/2007 | Miyaoka et al. | |
| 2007/0091759 A1 | 4/2007 | Yamamoto et al. | |
| 2007/0171800 A1 | 7/2007 | Okamoto et al. | |
| 2007/0177478 A1 | 8/2007 | Sumioka et al. | |

FOREIGN PATENT DOCUMENTS

JP    5-128530    5/1993

\* cited by examiner

*Primary Examiner*—Wayne R Young
*Assistant Examiner*—Van N Chow
(74) *Attorney, Agent, or Firm*—Fitzpatrick, Cella, Harper & Scinto

(57) ABSTRACT

A multi-level information reproducing method is provided which can increase the degree of separation between distributions of cell boundary values to thereby improve the accuracy of reproduction. Specifically, in a method of reproducing multi-level information recorded on a track of an optical information recording medium by virtually providing cells at equal intervals and by varying a width of an information pit in a track direction or an area of an information pit, a cell boundary value (a value obtained by sampling a reproduced signal when a center of a light spot is located at a boundary of cells) is corrected based on cell center values of two cells adjacent to the boundary (a value obtained by sampling a reproduced signal when the center of the light spot is located at a center of a cell), and the multi-level information is reproduced based on the corrected cell boundary value.

2 Claims, 13 Drawing Sheets

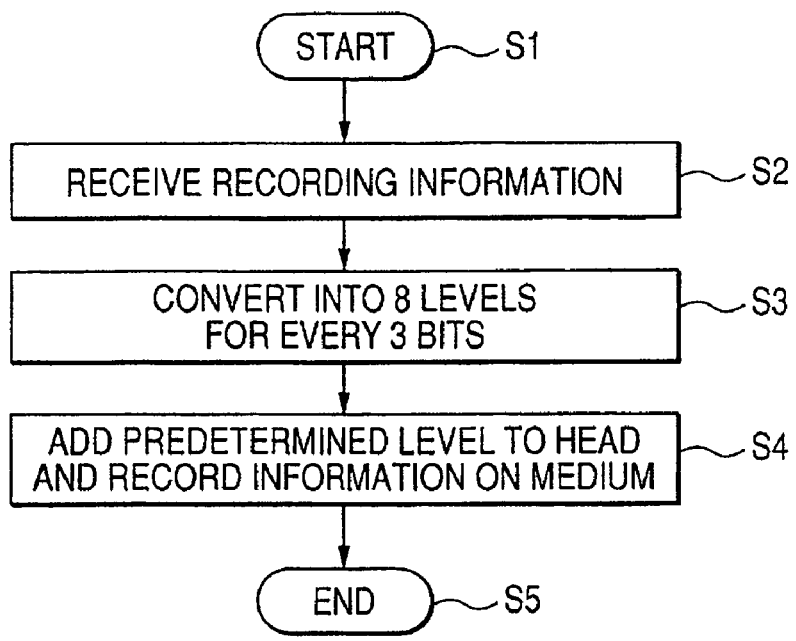
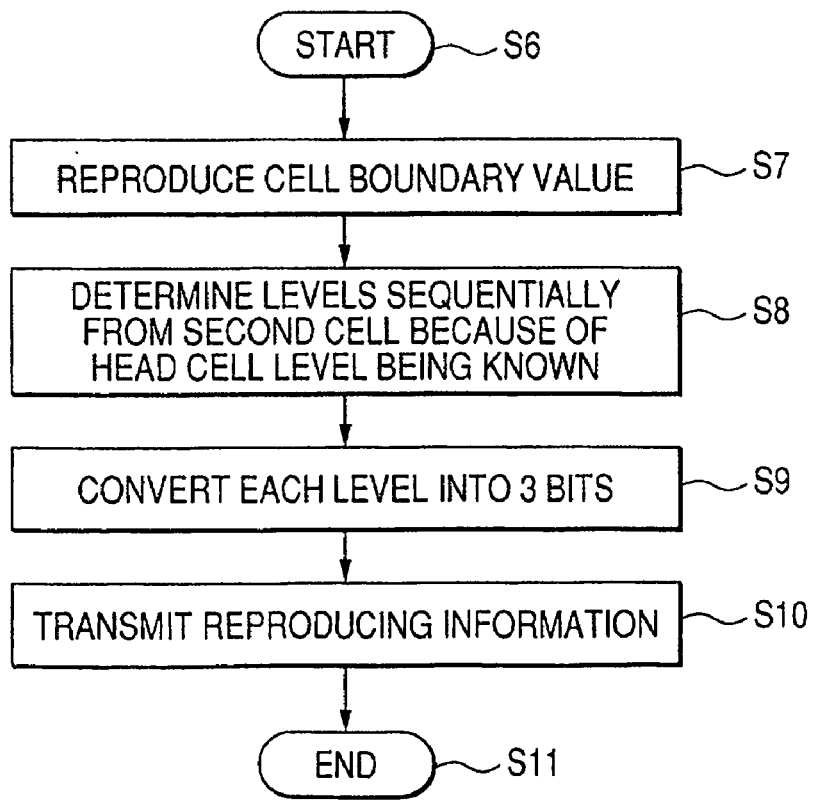

MULTI-LEVEL INFORMATION REPRODUCING METHOD

BACKGROUND OF THE INVENTION

1. Field of the Invention

The present invention relates to a multi-level information reproducing method of reproducing multi-level information recorded on an information recording medium.

2. Related Background Art

In recent years, the optical memory industry is growing, and read-only recording mediums including CDs and DVDs have been developed, and in addition, not only a write-once, read-many recording medium using a metal thin film or a dye recording material but also a rewritable recording medium using a magneto-optical material or a phase change material have been developed, and the applications are expanding from consumer devices to external memories of computers. Further, research and development for increasing the density of a recording capacity are under way, and a technique for realizing a very small size of a light spot for information recording/reproducing is being developed to improve the wavelength of a light source from a red region (650 nm) to a blue-violet region (405 nm). Moreover, the numerical aperture of an objective lens is also being increased from 0.6 or 0.65 to 0.85. On the other hand, a technique for more efficiently performing multi-level recording/reproducing using a light spot of the same size has been proposed.

For example, the present inventors have already proposed a technique related to the multi-level recording/reproducing in Japanese Patent Application Laid-open No. H05-128530. That is, multi-level information is recorded on an information track of an optical information recording medium based on a combination of a width of an information pit in a track direction and a shift amount of the information pit in the track direction relative to a reproducing light spot. Then, the recorded multi-level information is reproduced from the information pit based on a correlation between a detection signal learned in advance and a detection signal obtained from the light spot.

In the meeting of ISOM 2003, which is an international society of research in an optical disk field, a report has been presented on having performed multi-level recording/reproducing of an eight-level ("Write-once Disks for Multi-Level Optical Recording", Extended abstract Fr-Po-04). To be specific, a blue-violet light source (405 nm) and an optical system whose NA is 0.65 are used. In the case of an optical disk whose track pitch is 0.46 μm, the width of a region which is virtually provided to include an information pit for recording (hereinafter referred to as a cell) in the track direction is set to 0.26 μm.

For example, as shown in FIG. 14, selection of eight-level information pits is performed by divide the width of a cell in a track direction (direction indicated by arrow A in FIG. 14) into 16 equal parts. Then, it is defined that level 0 indicates that no information pit is recorded; level 1 indicates $2/16$ of the width of the cell; A level 2 indicates $4/16$ of the width of the cell. A level 3 indicates $6/16$ of the width of the cell. A level 4 indicates $8/16$ of the width of the cell. A level 5 indicates $10/16$ of the width of the cell. A level 6 indicates $12/16$ of the width of the cell. A level 7 indicates $14/16$ of the width of the cell.

The thus selected information pits are recorded at random. Further, a reproduced signal from the information pit is sampled at a timing when the center of a light spot is positioned at the center of the width of the cell in the track direction. As a result, the amplitudes of reproduced signals corresponding to the respective levels are obtained in a distribution as shown in FIG. 15.

Here, normalization is performed when the level 0 in which no information pit for writing is formed is repeated, an amplitude of the reproduced signal is as "1". In addition, when the information pit for recording corresponding to the level 7 is repeated, an amplitude of the reproduced signal is normalized as "0".

The values of reproduced signals corresponding to respective levels have a width because of the influence of information pits written before and after an information pit of question (inter-symbol interference). When the amplitude distribution of reproduced signals of a level overlaps that of an adjacent level as shown in FIG. 15, the levels cannot be separately detected based on a fixed threshold value.

In order to solve this problem, the following separation/detection system is described in the report presented in the ISOM2003 meeting. Reproduced signals of a pit string in which a value of an information pit of question and values of information pits which precede and follow the information pit of question are known in advance are read and then stored (learning). Then, reproduced signals from actual information pits are compared with the stored values (correlation) to thereby perform separate detection. In this system, the recording density is approximately 16 Gbit/inch$^2$.

Further, a higher recording density of approximately 30 Gbit/inch$^2$ is to be attained based on the multi-level system presented in the ISOM2003 meeting, by using a blue-violet light source (405 nm) and an optical system with an NA of 0.85 thereby making a light spot finer, there is posed the problem that the amount of inter-symbol interference becomes larger, whereby the overlapping between amplitude distributions of reproduced signals for respective levels shown in FIG. 15 becomes more prominent to thereby increase reproducing errors.

SUMMARY OF THE INVENTION

An object of the present invention is to provide a multi-level information reproducing method capable of increasing the degree of separation between distributions of inter-cell values to improve the accuracy of reproduction.

According to the present invention, there is provided a method of reproducing a multi-level information recorded on a track of an optical information recording medium by virtually providing cells at equal intervals and by varying a width of an information pit in a track direction or an area of an information pit, the method comprising the steps of:

detecting a reproduced signal from the optical information recording medium by use of an optical head;

when a center of a light spot from the optical head is located at a center of one of the cells, sampling the reproduced signal to obtain a cell center value;

when the center of the light spot is located at a boundary between preceding one of the cells and following (or subsequent) one cell adjacent thereto, sampling the reproduced signal to obtain a cell boundary value;

correcting the cell boundary value based on a difference between the cell center values of the adjacent, preceding and following cells; and reproducing the multi-level information based on the corrected cell boundary value.

In the present invention, it is preferred that the correction is performed based on a value obtained by subtracting an absolute value of the difference between the cell center values of the adjacent, preceding and following cells from the cell boundary value.

BRIEF DESCRIPTION OF THE DRAWINGS

FIG. 12 is a flow chart for explaining an information recording operation in accordance with the present invention;

FIG. 13 is a flow chart for explaining an information reproducing operation in accordance with the present invention;

DESCRIPTION OF THE PREFERRED EMBODIMENT

Figure 1:
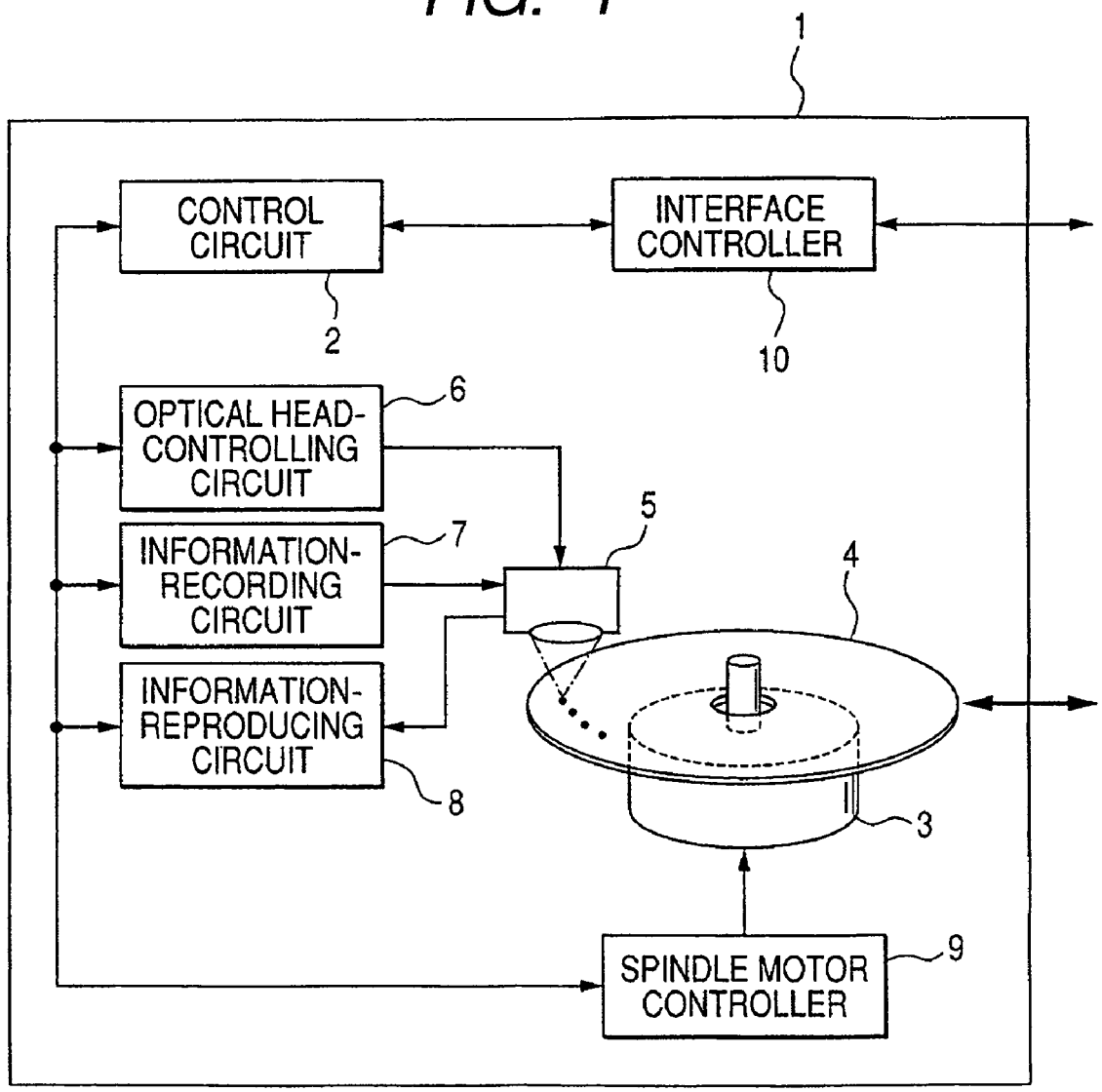
FIG. 1 is a block diagram showing an example of an optical information recording/reproducing apparatus for performing the multi-level information reproducing method according to the present invention.

Hereinafter, a best mode for embodying the present invention will be described in detail with reference to the accompany drawings. FIG. 1 is a block diagram showing a structure of an optical information recording/reproducing apparatus for performing a multi-level information reproducing method according to an embodiment of the present invention. An optical information recording/reproducing apparatus 1 includes a control circuit 2, a spindle motor 3, an optical disk 4, an optical head 5, an optical head control circuit 6, an information recording circuit 7, an information reproducing circuit 8, a spindle motor controller 9, and an interface controller 10.

The control circuit 2 controls transmission and reception of an information to and from an external information processing apparatus such as a computer, controls recording/reproducing of an information on and from the optical disk 4 through the information recording circuit 7 and the information reproducing circuit 8, and controls the operations of other sections. As described later, the information recording circuit 7 records a multi-level information. The information reproducing circuit 8 reproduces a recorded multi-level information.

The spindle motor 3 is controlled by the spindle motor controller 9 to rotate the optical disk 4. The optical disk 4 is an optical information recording medium which is insertable to and ejectable from a main body of the optical information recording/reproducing apparatus 1 by a mechanism (not shown).

The optical head 5 is used to optically record an information on the optical disk 4 using a light spot and to optically detect a reproduced signal using the light spot. In the optical head 5, for example, when the wavelength of a light source is 405 nm and the numerical aperture of an objective lens is 0.85, the size of the light spot becomes approximately 0.405 μm. The track pitch of the optical disk 4 is 0.32 μm. The optical head control circuit 6 controls the position of the light spot made by the optical head 5 to perform auto-tracking control, seek operation control, and auto-focusing control.

Figure 2:
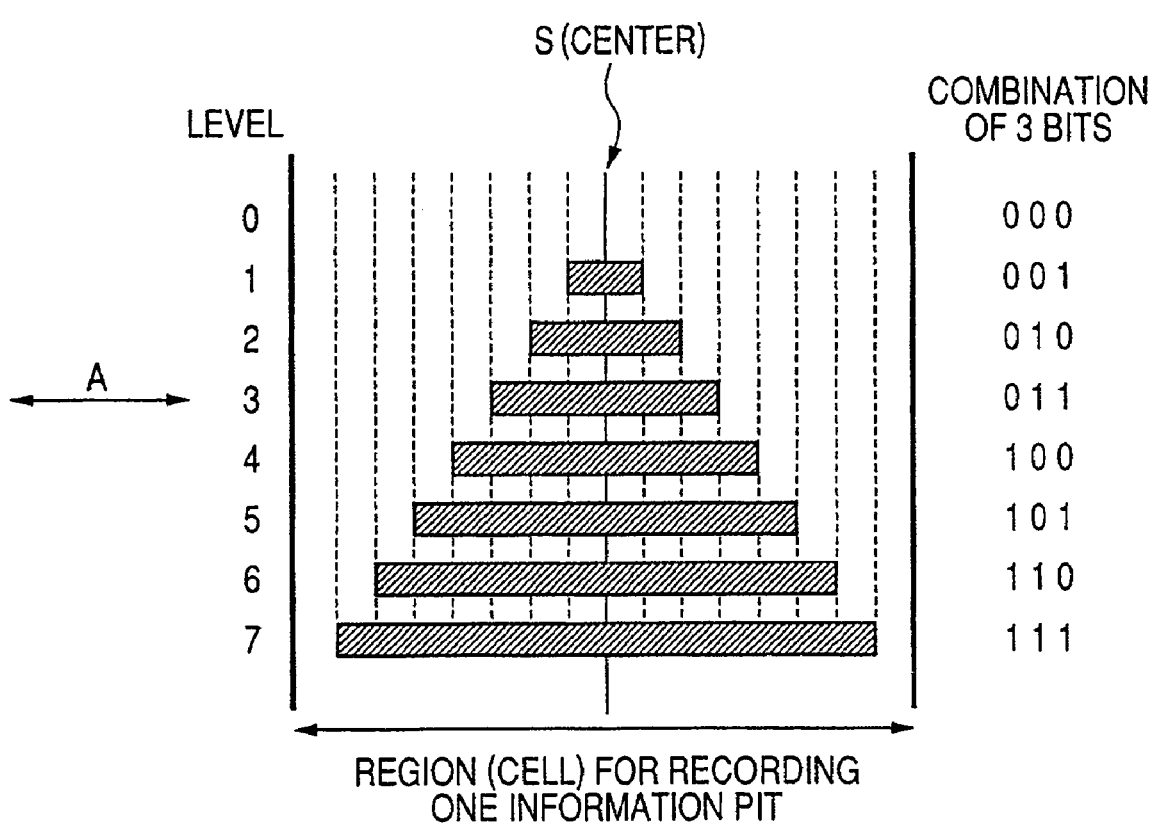
FIG. 2 is an explanatory diagram showing combinations of widths in a track direction based on different levels of multi-level information pits and three bits corresponding thereto according to the present invention.

FIG. 2 is an explanatory diagram showing the widths of information pits in the track direction (direction indicated by arrow A in FIG. 2) corresponding to different levels of multi-level information pit used in the present invention. For convenience of description, the width of each information pit in a direction perpendicular to the track direction is depicted to be smaller than an actual width.

In FIG. 2, a region sandwiched by two thick solid lines means a cell. In this embodiment, the size of the light spot is approximately 0.405 μm and the track pitch of the optical disk 4 is 0.32 μm. Therefore, when the width of the cell is set to approximately 0.2 μm, an areal recording density of 30 Gbit/inch$^2$ can be achieved. Thus, in this embodiment, the description will be continued with the width of the cell being 0.2 μm.

In this case, the width of a smallest information pit (level 1) becomes 25 nm, and the other levels are such that level 2 is 50 nm; level 3 is 75 nm; level 4 is 100 nm; level 5 is 125 nm; level 6 is 150 nm; and level 7 is 175 nm. Here, it is assumed that level 0 indicates a state in which no information pit is recorded.

The present system is an eight-level record and thus an information corresponding to three bits can be recorded in a single cell. For example, as shown in FIG. 2, for an information of three bits, it is assumed that (0, 0, 0) corresponds to level 0; (0, 0, 1) corresponds to level 1; (0, 1, 0) corresponds to level 2; (0, 1, 1) corresponds to level 3; (1, 0, 0) corresponds to level 4; (1, 0, 1) corresponds to level 5; (1, 1, 0) corresponds to level 6; and (1, 1, 1) corresponds to level 7. Another type of correspondence system may be used.

Figure 3:
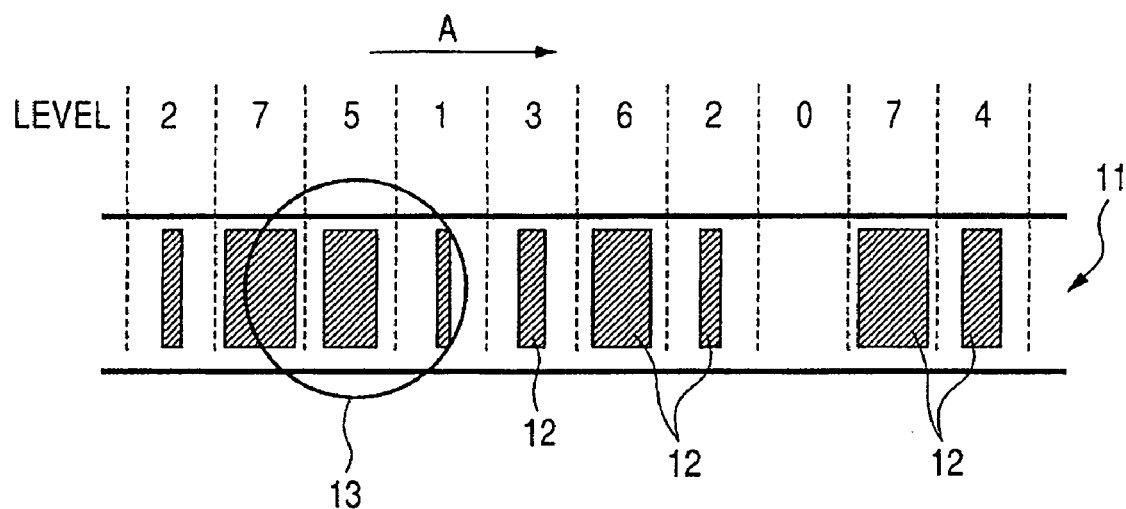
FIG. 3 is a schematic diagram showing the relationship between random information pits recorded to a track and a light spot.

FIG. 3 is a schematic diagram showing the relationship between random information pits 12 recorded to a track 11 on an optical disk 4 and a light spot 13. For example, when a phase change material is used as a recording material capable of recording/erasing, the light spot 13 is irradiated to the optical disk 4, and the light quantity and timing for each of recording pulse, erasing pulse, and cooling pulse are adjusted.

Thereby, the shapes of information pits are made to differ from one another to form information pits of a plurality of reproducing levels.

In FIG. 3, for the sake of convenience, it is depicted that the respective information pits are made to have shapes of rectangles whose widths in the track direction are different from each other. However, the present invention is not limited to the use of the rectangular information pits and also applicable to marks of other shapes such as circular marks, ellipsoidal marks, arrowhead marks, or the like, as long as they represent the areas of respective levels.

Incidentally, as the recording material capable of recording/erasing, a magneto-optical material can also be used instead of the phase change material. In this case, in the above-mentioned optical information recording/reproducing apparatus, by utilizing a combined action of the light spot and a magnetic field exerted from a magnetic head (not shown), the shapes of information pits are adjusted to form information pits of a plurality of reproducing levels.

Further, the present invention can be applied also to a write-once read many type recording material, and a light spot is irradiated to an optical disk using an organic dye or a metal film as a recording material and the recording light quantity and timing thereof are adjusted. Thereby, the shapes of information pits can be made to differ from each other to thereby form information pits of a plurality of reproducing levels. Moreover, even in the case of a read-only type recording medium, information pits can similarly be formed in uneven shapes called phase pits in a substrate, and by modulating the areas of the phase pits or the optical depths of the phase pits, multi-level recording is made possible.

In order to increase a recording capacity, it is necessary to reduce the size of each cell. When the size of each cell is reduced, as shown in FIG. 3, information pits of two or three cells will be contained in the range of the light spot 13. On the assumption that such multi-level recording is to be performed, description of the principle of this embodiment will be continued by taking the case where the phase change material is used as an example.

In FIG. 3, an arrow A indicates the track direction and reference numeral 11 denotes a track in an optical disk in which information pits are recorded. Regions divided by broken lines indicates cells which are virtually provided, and information pits 12 are recorded therein corresponding to level numbers shown in the upper part of FIG. 3 which are defined in accordance with the system shown in FIG. 2. Reference numeral 13 denotes a light spot.

In this embodiment, the size of the light spot is approximately 0.405 μm and the width of the cell is 0.2 μm. In the case of such a scale, the areal recording density can be increased to be approximately 1.5 times the areal recording density of approximately 19.5 Gbit/inch$^2$ obtained by a conventional binary-level recording method (for example, 1-7PP modulation; 2T=139 nm).

Next, the results of optical simulation for determining the state of a reproduced signal by the present method will be described.

Figure 4:
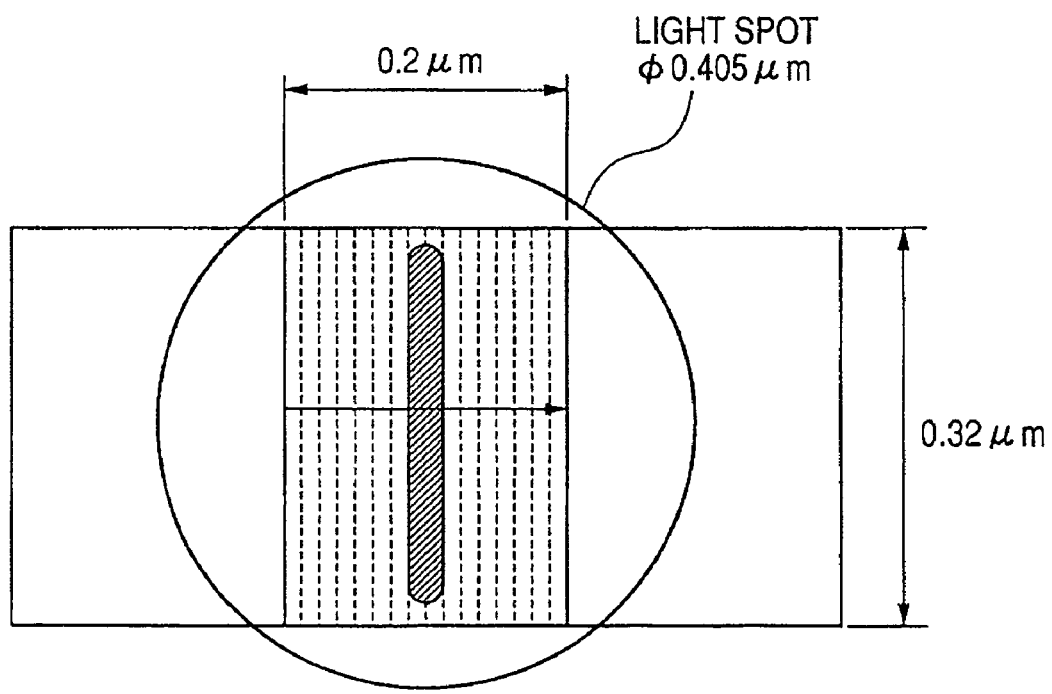
FIG. 4 is an explanatory view showing parameters used for an optical simulation to explain a reproduction principle according to the present invention.
Figure 5:
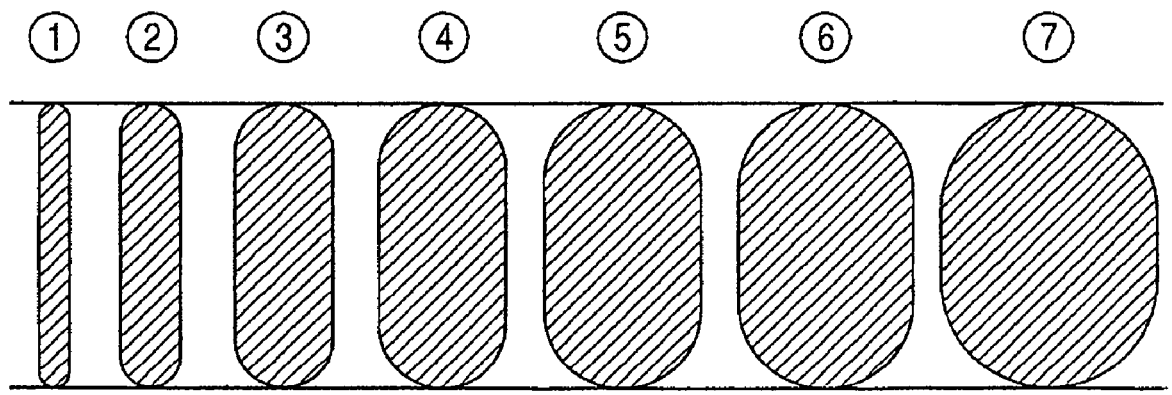
FIG. 5 is an explanatory diagram showing the shapes of information pits provided in the optical simulation to explain the reproduction principle according to the present invention.

FIG. 4 shows parameters used for the optical simulation. The track pitch is 0.32 μm and the size of the light spot is 0.405 μm (wavelength: 405 nm; numerical aperture (NA) of objective lens: 0.85). The size (width) of the cell is 0.2 μm, and the information pits have shapes shown in FIG. 2 and are formed corresponding to the respective levels as shown in FIG. 5.

Figure 6:
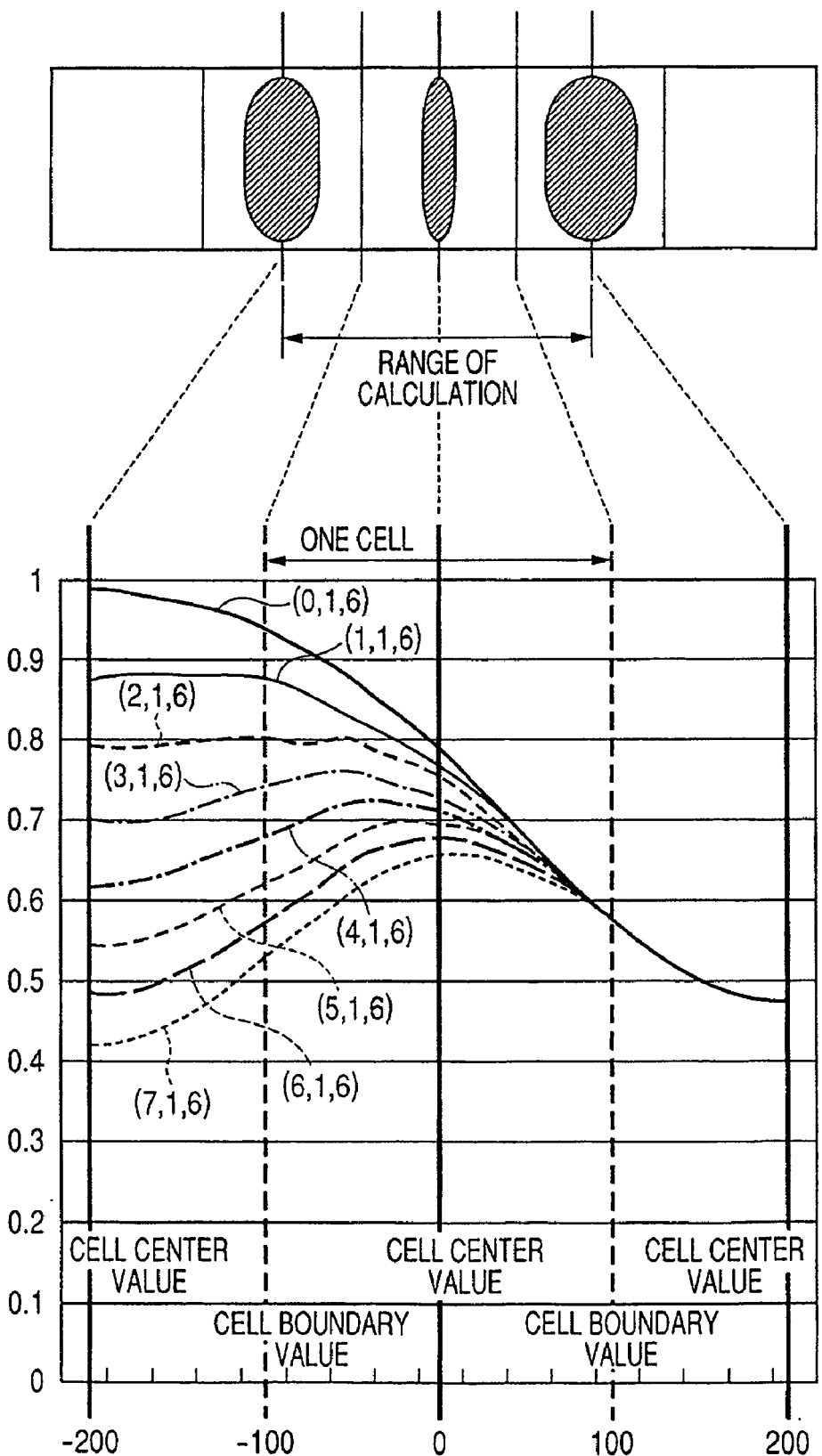
FIG. 6 is a graphical representation for explaining calculation results of the optical simulation to explain the reproduction principle according to the present invention, which shows reproduced signals for combinations of information pits written in three successive cells.

FIG. 6 shows the results of calculation of reproduced signals (reflection light quantities) when combinations of eight kinds of levels are successively given to three successive cells (the total number of all combinations are 8×8×8=512) and the light spot is moved from the center of the first cell to the center of the third cell.

The lower part of FIG. 6 is depicted by taking as an example the eight kinds of combinations of from (0, 1, 6) to (7, 1, 6) of the levels of the respective cells (all cells other than the three cells having the level 0).

In FIG. 6, positions on each of three solid lines each indicate a reproduced signal value obtained when the light spot is located at the center of the corresponding cell (cell center value), and positions on each of two broken lines each indicate a reproduced signal value obtained when the light spot is located at a boundary between adjacent cells (cell boundary value).

The following can be seen from FIG. 6. For the given parameters, the cell center value of the middle cell corresponds to level "1" but does not take the same value and has a width because the level of the left cell is changed from "0" to "7". This is an influence of an inter-symbol interference. However, the cell center value of the right cell takes a substantially constant value as long as the level of the middle cell is constant to be "1", irrespective of the level of the left cell.

In other words, it can be seen that the range of the influence of the inter-symbol interference on the cell center value includes only the right and left adjacent cells and thus the influences from cells outside the adjacent cells can be neglected. This is intuitively recognizable from the fact that the skirt portion of the light spot located on the middle cell extends over the right and left cells in FIG. 4.

Figure 7:
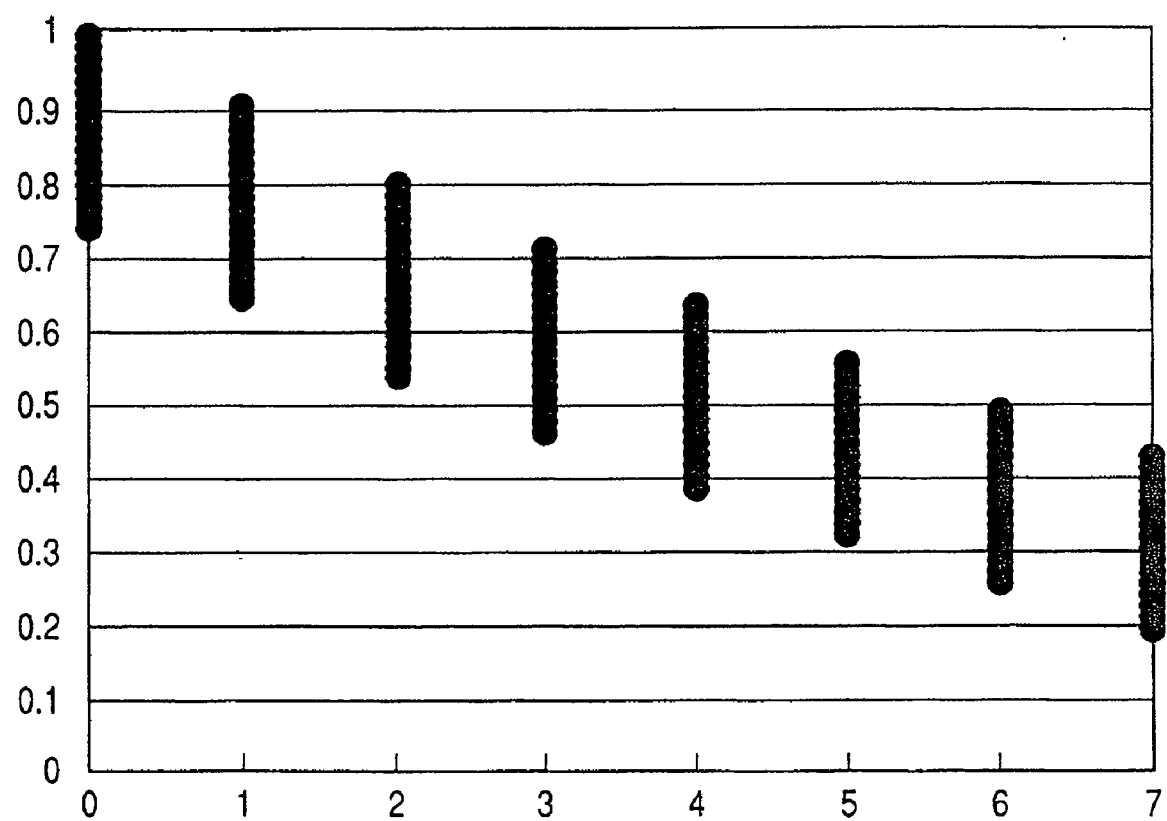
FIG. 7 is a graphical representation showing amplitude distributions of cell center values based on optical system parameters for an optical information recording/reproducing apparatus according to the present invention.

FIG. 7 is a graphical representation showing amplitude distributions of respective reproduced signals with respect to all combinations of levels recorded on the three successive cells with the levels of the middle cell being indicated in the abscissa (being normalized in terms of reflectances of a marked portion and a non-marked portion).

Figure 15:
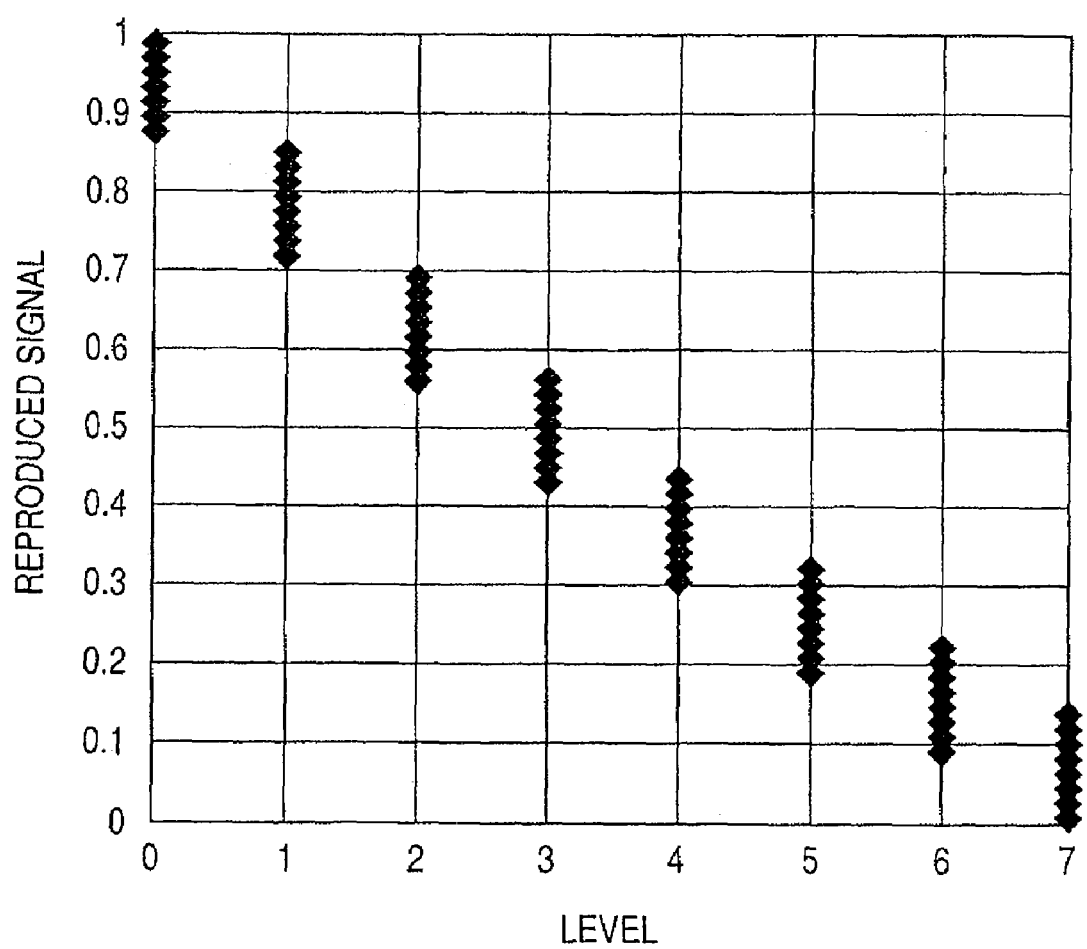
FIG. 15 is a graphical representation for explaining amplitude distributions of cell center values according to prior art.

As compared with the distributions shown in FIG. 15, the overlapping between the distributions of the reproduced signals between adjacent levels increases, which makes it difficult to perform level recognition using fixed threshold values. In general, the reproduced signal is subjected to a signal processing such as waveform equalization to thereby improve the degree of separation between the distributions of reproduced signals. However, such processing has limitations. Therefore, a method of correcting the cell boundary values and determining the level of information pits will be described below.

The description will be continued with reference to FIG. 6. When paying attention to the reproduced signal values obtained at a boundary between adjacent cells (cell boundary value), it is seen that the cell boundary value at the boundary between the right cell and the middle cell is substantially constant. In other words, the following can be seen. In the case where the combinations of the adjacent levels are the same ("1" and "6" for the middle and right cells in this case), irrespective of the level of a cell outside thereof (the left cell in this case), the cell boundary value is not significantly influenced, so that the influence of the inter-symbol interference is slight.

Figure 8:
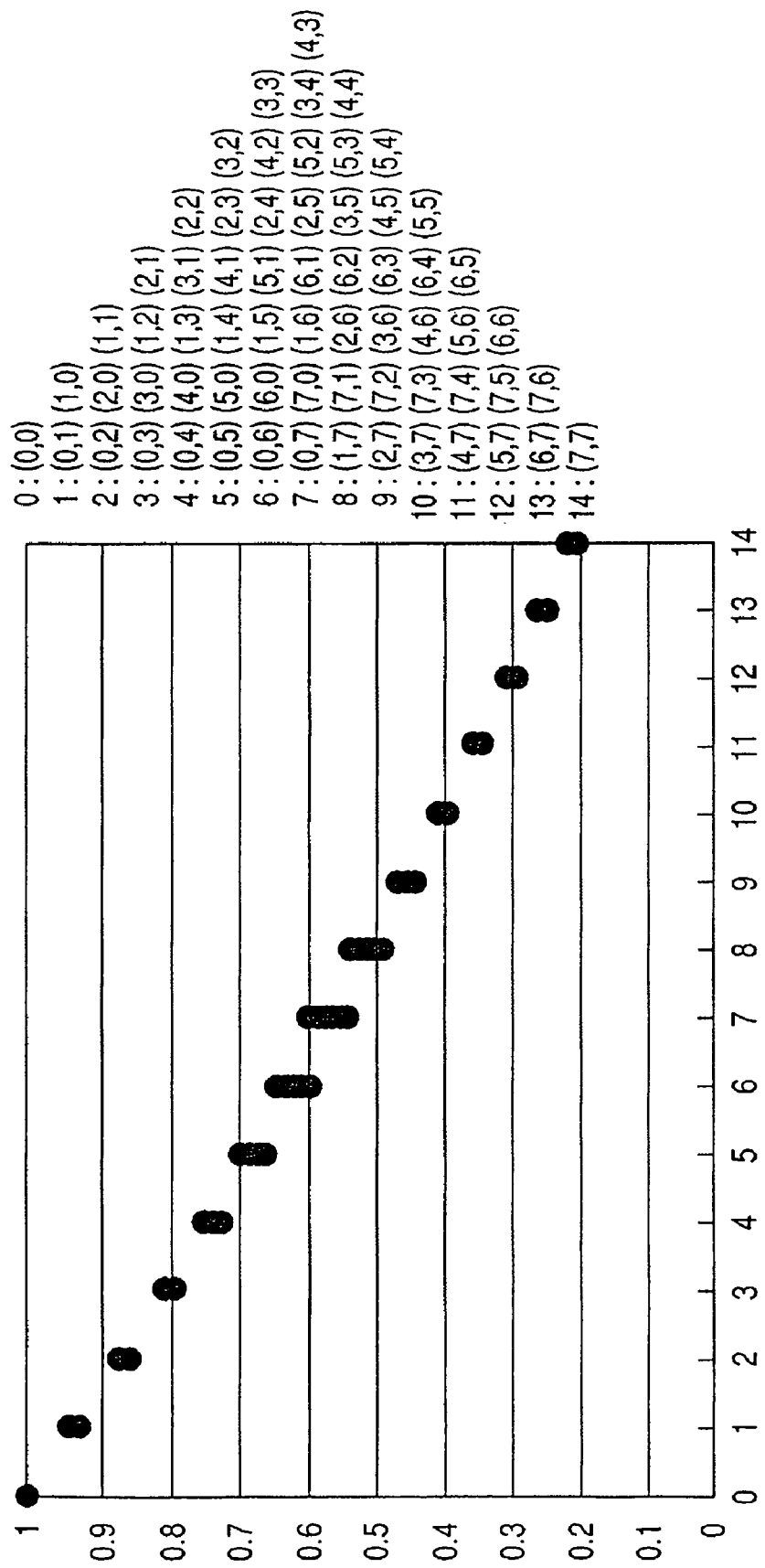
FIG. 8 is a graphical representation showing amplitude distributions of cell boundary values based on optical system parameters for an optical information recording/reproducing apparatus according to the present invention and combinations of levels of two adjacent cells.

The left part of FIG. 8 shows amplitude distributions of reproduced signals of cell boundary values (being normalized in terms of reflectances of a marked portion and a non-marked portion) which correspond to combinations of two adjacent cells (all combinations being 8×8=64). A total value of levels of the two adjacent cells is indicated in the abscissa. That is, the total values can be classified into 15 values from 0-value of (0, 0) to 14-value of (7, 7).

It can be seen that the total values are separated into 15 values of from 0 to 14 without performing signal processing such as waveform equalization. Further, the right part of FIG. 8 shows combinations of levels of the two adjacent cells which correspond to the 15 values.

Therefore, when the level of a preceding cell is known, the level of a following cell can be unequivocally (or necessarily or inevitably) determined by detecting the cell boundary value. For example, when the level of the preceding cell is known to be "3" and the cell boundary value can be detected to be a "7-value", the level of the following cell can be determined to be "4" because of 7−3=4.

In general, when the level of a preceding cell is "X" ($0 \leq X \leq 7$; X being an integer), the level of a following cell is "Y" ($0 \leq Y \leq 7$; Y being an integer), and a cell boundary value is "Z" ($0 \leq Z \leq 14$; Z being an integer), it is then established that X+Y=Z (or Z−X=Y).

Figure 9:
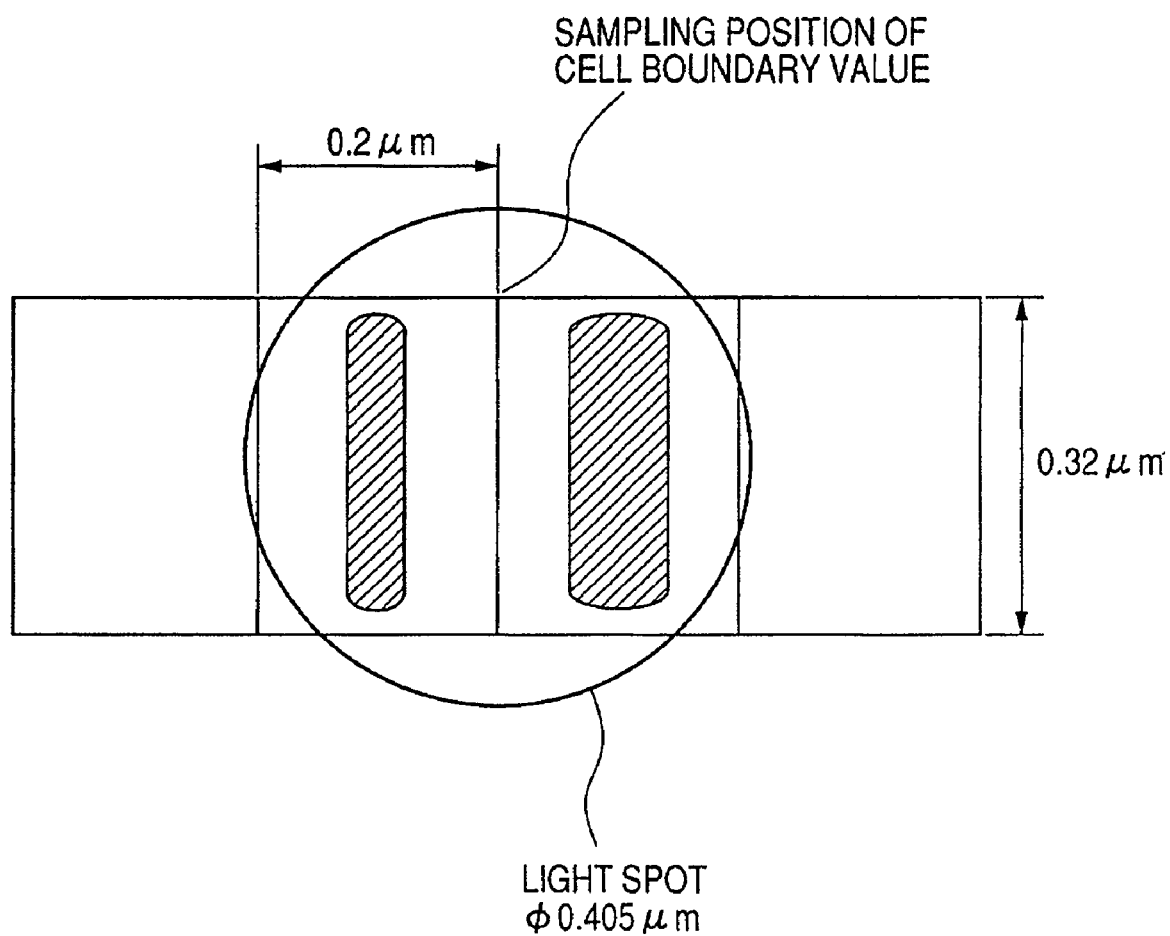
FIG. 9 is an explanatory view showing a positional relationship between preceding and following cells and a light spot when sampling cell boundary values.

FIG. 9 shows a positional relationship in a case where a light spot is located at a boundary between two adjacent cells. The size of the light spot is 0.405 μm and the total of widths of the two cells is 0.4 μm, so that almost the entirety of the light spot is located on the two adjacent cells. That is, it can intuitively be seen that there is almost no influence from an outside of the cells.

Returning to FIG. 8, it can be seen that the distributions of the values at a central part each have a width, so that the degree of distribution is low. In order to improve the accuracy of reproduction, it is preferable to increase the degree of separation.

Figure 10:
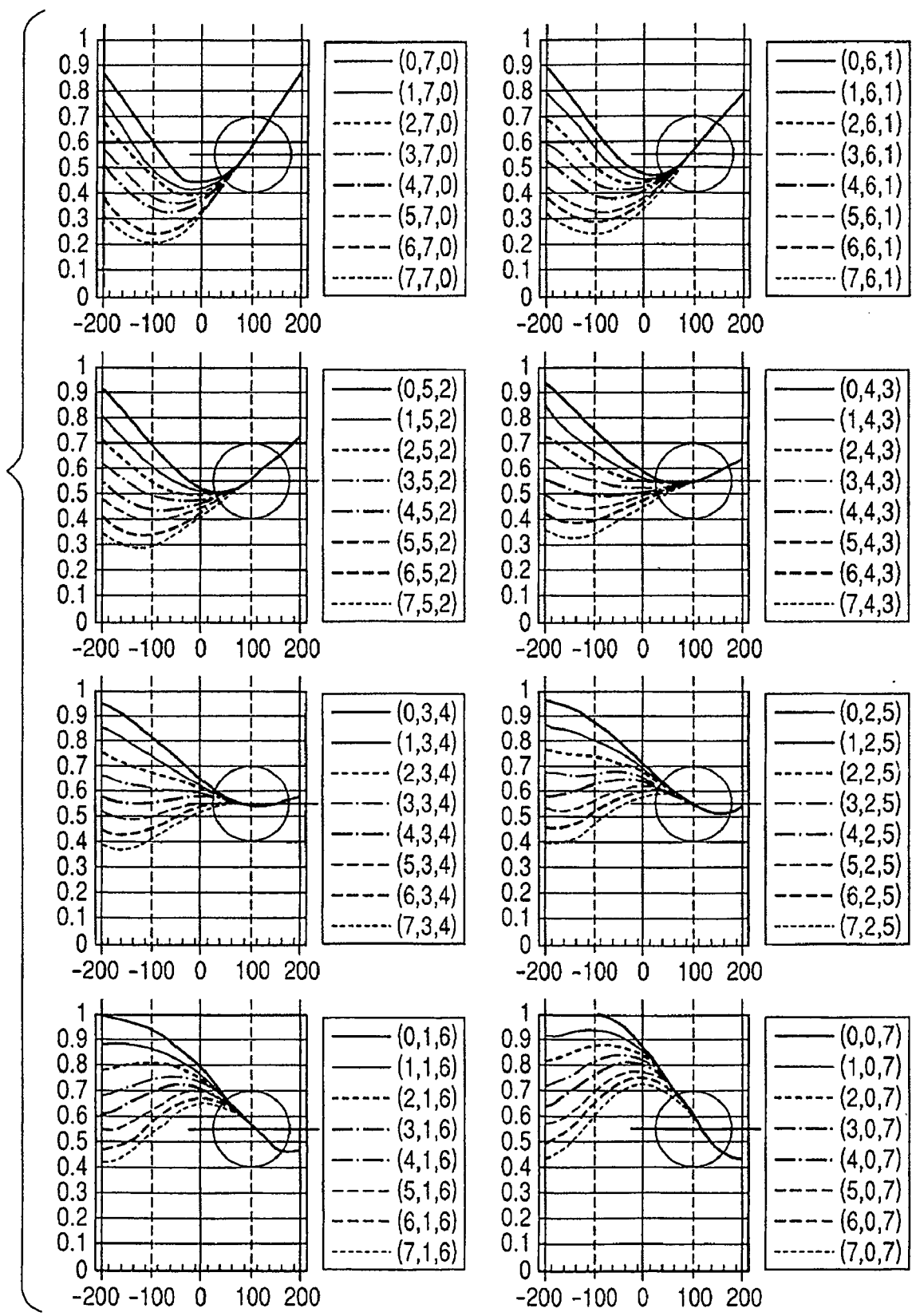
FIG. 10 is a graphical representation showing results of simulation of all combinations showing a cell boundary value "7"

Next, a method of increasing the degree of separation of distributions of cell boundary values according to the present invention will be described with reference to FIGS. 10 and 11. FIG. 10 shows results of simulation for all combinations of two adjacent cells having a cell boundary value of "7", that is, (7, 0), (6, 1), (5, 2), (4, 3), (3, 4), (2, 5), (1, 6), and (0, 7). In each of the eight graphical parts of FIG. 10, as is the case with FIG. 6, positions on each of three solid lines indicate cell center values, and positions on each of two broken lines indicate cell boundary values. In each of the 8 graphical parts, a circle is drawn around a point of a cell boundary value of 0.55 on the right broken line and a horizontal line is drawn crossing the broken line at that point.

It can be seen that, adjacent cells with a grater difference in the levels therebetween provide a cell boundary value which is more higher than the value 0.55 on the horizontal line. That is, it is seen that a maximum value is obtained in the cases of (7, 0) and (0, 7), and the value becomes smaller in the order of cases of (6, 1) and (1, 6), cases of (5, 2) and (2, 5), and cases of (4, 3) and (3, 4).

In the present invention, the above-mentioned specific feature is utilized, and the values obtained by the procedure described above with reference to FIG. 8 are corrected by using the following equation:

(Cell boundary value obtained in FIG. 8)−α×(Absolute value of difference in cell center values of adjacent cells)

wherein α is a constant determined based on an optical system, a structure of a medium or the like. FIG. 11 shows the results of the correction.

Figure 11:
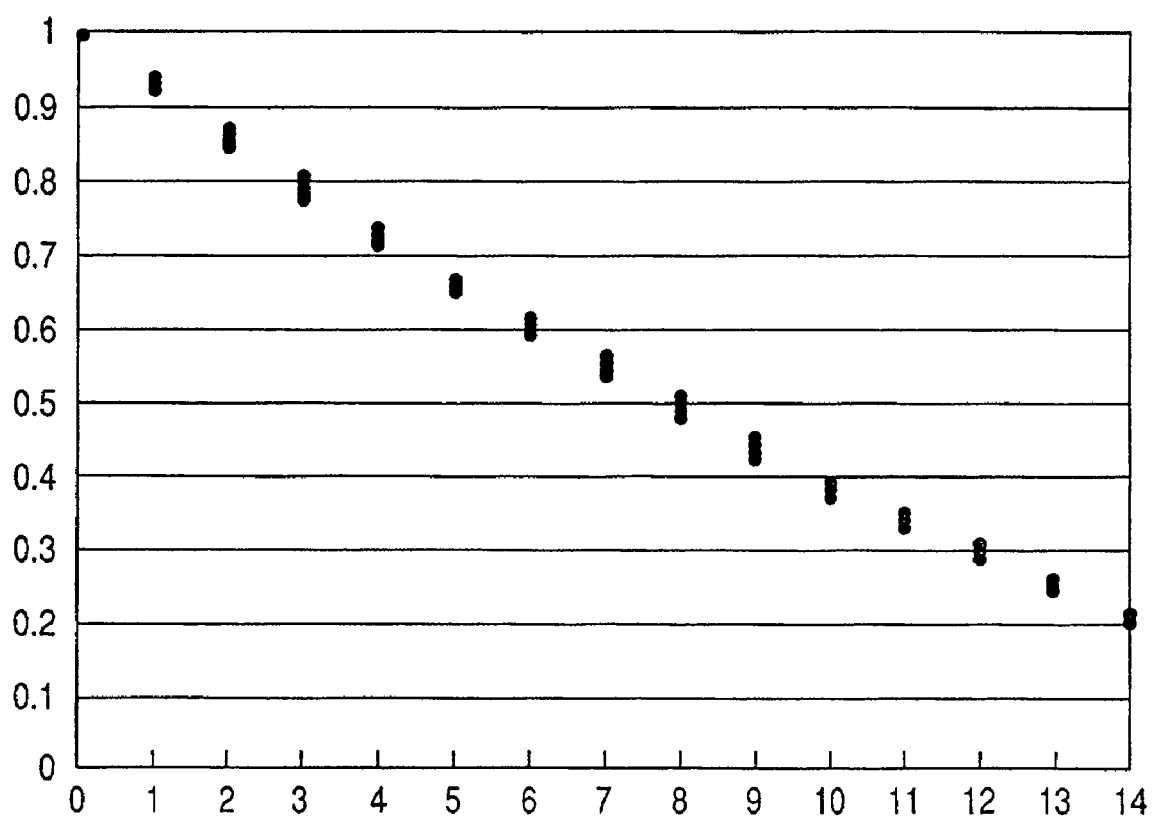
FIG. 11 is a graphical representation showing amplitude distributions of corrected cell boundary values.
Figure 14:
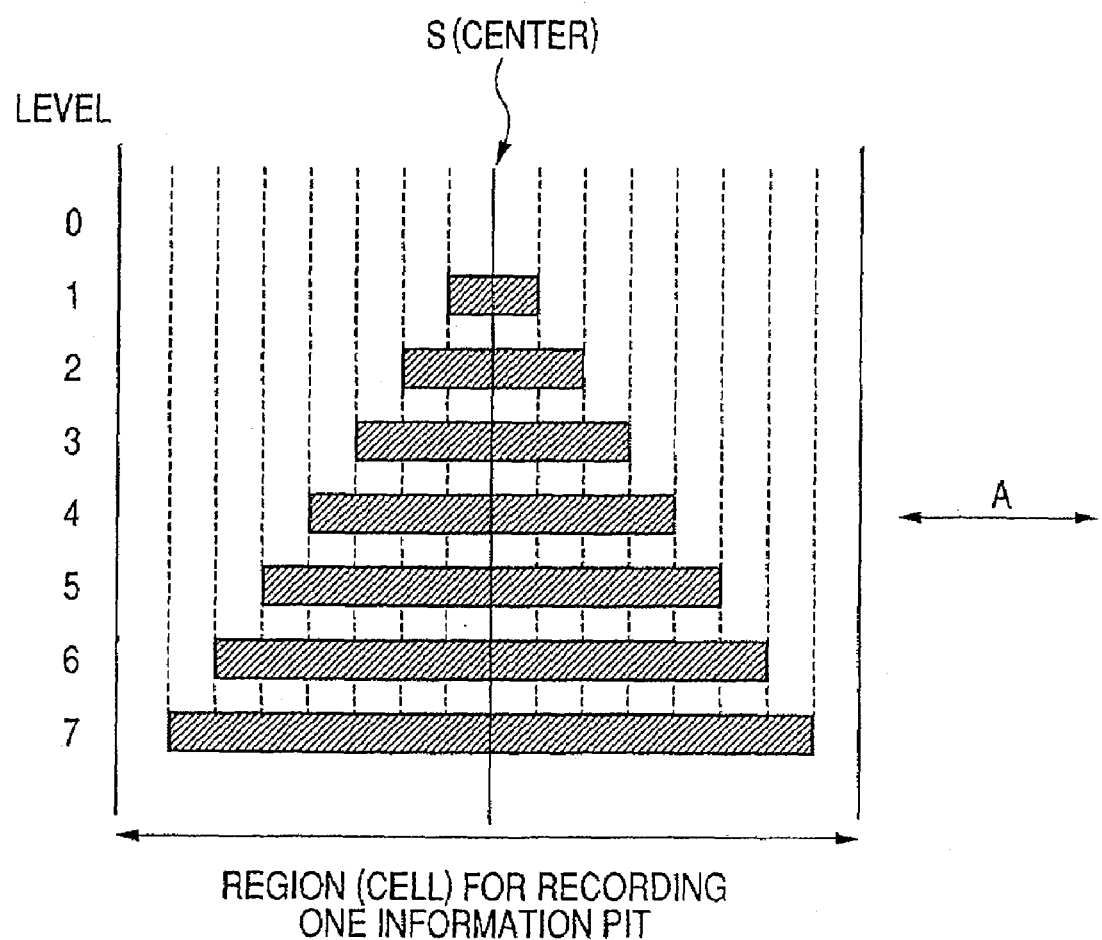
FIG. 14 is an explanatory diagram showing widths in a track direction based on different levels of multi-level information pits according to prior art.

It can be seen from FIG. 11 that the widths of distributions of reproduced signals at the central part are reduced, whereby the degree of separation is increased. Therefore, the accuracy of reproduction can be improved. Incidentally, waveform equalization can be combined with this system.

A procedure for the above described recording/reproducing of multi-level information according to the present invention will be described with reference to FIGS. 12 and 13. Incidentally, the following procedure is carried out mainly by the information recording circuit 7 and the information reproducing circuit 8 under the control of the control circuit 2.

FIG. 12 shows a recording procedure.

When recording an information, the optical information recording/reproducing apparatus 1, upon receiving an instruction for information recording, starts an operation in Step S1. Then, in Step S2, the interface controller 10 receives a transmitted recording information.

Next, in Step S3, the recording information is converted into eight levels for every three bits as shown in FIG. 2 (here, modulation may be performed or error correction code may be added). Further, in Step S4, a predetermined level (for example, a multi-level information of level 0) is added to a head of a series of multi-level information of eight levels, and the multi-level information is recorded on a target track on the optical disk 4 as an optical information medium using the optical head 5. When the recording of all recording information is completed, the procedure goes to Step S5 and the recording operation is finished.

Next, a procedure for reproducing the multi-level information thus recorded on the optical disk 4 will be described with reference to FIG. 13.

The optical information recording/reproducing apparatus 1, upon receiving an instruction for information reproduction, starts an operation in Step S6.

Next, in Step S7, the cell boundary values are sequentially read from the target track of the optical disk 4 by using the optical head 5. Further, in Step S8, since the level of a head cell is known to be level 0 in this example as described above, the cell boundary value is corrected for a second cell and subsequent cells depending on a difference between the cell center values of the preceding and following cells, thereby sequentially determining the respective levels.

In Step S9, the determined level of each cell is converted into three-bit information based on the correspondence between the levels and the combinations of three bits as shown in FIG. 2 (here, error correction or demodulation may be carried out). Then, in Step S10, the read reproducing information is transmitted through the interface controller 10. After all information is transmitted, the procedure advances to Step S11 and the reproducing operation is finished.

Incidentally, in Step S4 shown in FIG. 12, it has been described that the predetermined level is recorded at the head. However, when there is a continuous occurrence of level 0 or level 7 in the information (or information subjected to modulation), as is seen also from FIG. 8, the levels of two adjacent cells are unequivocally (or necessarily or inevitably) determined by reproduction of the cell boundary value. Therefore, all values can be determined from those values.

However, in the case where read error is caused by an influence of a noise or the like, when the number of recording positions of unequivocally determined information is small, an error may be propagated. Therefore, when information of a predetermined level is recorded for every a given number of cells, it is possible to perform recording/reproducing of multi-level information with higher accuracy.

As described above, according to the present invention, by correcting a cell boundary value depending on a difference between cell center values of preceding and following cells for which the cell boundary value has been obtained, the degree of separation between distributions of cell boundary values can be increased and the accuracy of reproduction can be improved.

This application claims priority from Japanese Patent Application No. 2005-150985 filed on May 24, 2005, which is hereby incorporated by reference herein.

What is claimed is:

1. A method of reproducing a multi-level information recorded on a track of an optical information recording medium by virtually providing cells at equal intervals and by varying a width of an information pit in a track direction or an area of an information pit, the method comprising the steps of:

detecting a reproduced signal from the optical information recording medium by use of an optical head;

when a center of a light spot from the optical head is located at a center of one of the cells, sampling the reproduced signal to obtain a cell center value;

when the center of the light spot is located at a boundary between preceding one of the cells and following one cell adjacent thereto, sampling the reproduced signal to obtain a cell boundary value;

correcting the cell boundary value based on a difference between the cell center values of the adjacent, preceding and following cells; and reproducing the multi-level information based on the corrected cell boundary value.

2. The method according to claim 1, wherein the correction is performed based on a value obtained by subtracting an absolute value of the difference between the cell center values of the adjacent, preceding and following cells from the cell boundary value.

* * * * *